(12) United States Patent
Pottker et al.

(10) Patent No.: US 9,982,180 B2
(45) Date of Patent: May 29, 2018

(54) HEAT TRANSFER COMPOSITIONS AND METHODS

(71) Applicant: HONEYWELL INTERNATIONAL INC., Morristown, NJ (US)

(72) Inventors: Gustavo Pottker, Amherst, NY (US); Mark W. Spatz, East Amherst, NY (US); Samuel F. Yana Motta, East Amherst, NY (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days. days.

(21) Appl. No.: 13/801,236

(22) Filed: Mar. 13, 2013

(65) Prior Publication Data

US 2014/0223927 A1    Aug. 14, 2014

Related U.S. Application Data

(60) Provisional application No. 61/764,200, filed on Feb. 13, 2013.

(51) Int. Cl.
*C09K 5/04* (2006.01)

(52) U.S. Cl.
CPC ........ *C09K 5/045* (2013.01); *C09K 2205/126* (2013.01); *C09K 2205/22* (2013.01)

(58) Field of Classification Search
CPC .............. C09K 5/045; C09K 2205/126; C09K 2205/22
See application file for complete search history.

(56) References Cited

U.S. PATENT DOCUMENTS

| | | |
|---|---|---|
| 6,516,837 B2 | 2/2003 | Thomas et al. |
| 8,024,937 B2 | 9/2011 | Minor |
| 8,246,850 B2 | 8/2012 | Rached |
| 8,252,198 B2 | 8/2012 | Rached |
| 8,318,647 B2 | 11/2012 | Carr et al. |
| 8,333,901 B2 | 12/2012 | Low |
| 2009/0314015 A1 | 12/2009 | Minor et al. |
| 2010/0122545 A1 | 5/2010 | Minor et al. |
| 2010/0186432 A1 | 7/2010 | Perti et al. |
| 2010/0193155 A1 | 8/2010 | Nakatani et al. |
| 2011/0006248 A1 | 1/2011 | Van Horn et al. |
| 2011/0011123 A1 | 1/2011 | Matsuura et al. |
| 2011/0012052 A1 | 1/2011 | Van Horn et al. |
| 2011/0108756 A1 | 5/2011 | Tsuchiya et al. |
| 2011/0186772 A1 | 8/2011 | Rached |
| 2011/0219815 A1* | 9/2011 | Yana Motta et al. ........... 62/498 |
| 2011/0253927 A1 | 10/2011 | Minor et al. |
| 2012/0087822 A1 | 4/2012 | Nakano et al. |
| 2012/0104307 A1 | 5/2012 | Bogdan et al. |
| 2012/0119136 A1 | 5/2012 | Yana Motta et al. |
| 2012/0131947 A1 | 5/2012 | Nakano et al. |
| 2012/0132848 A1 | 5/2012 | Sawada et al. |
| 2012/0151958 A1 | 6/2012 | Rached |
| 2012/0153213 A1 | 6/2012 | Rached |
| 2012/0159982 A1 | 6/2012 | Rached |
| 2012/0161063 A1 | 6/2012 | Singh |
| 2012/0161064 A1 | 6/2012 | Rached |
| 2012/0167615 A1 | 7/2012 | Rached |
| 2012/0202904 A1 | 8/2012 | Chen et al. |
| 2012/0204586 A1 | 8/2012 | Kawabe et al. |
| 2012/0216551 A1 | 8/2012 | Minor et al. |
| 2012/0223269 A1 | 9/2012 | Van Horn et al. |
| 2012/0228541 A1 | 9/2012 | Takigawa et al. |
| 2012/0255316 A1 | 10/2012 | Andre et al. |
| 2012/0298909 A1 | 11/2012 | Low |
| 2012/0304687 A1 | 12/2012 | Sato et al. |
| 2013/0015395 A1 | 1/2013 | Yana Motta et al. |

FOREIGN PATENT DOCUMENTS

| | | |
|---|---|---|
| WO | 2008009922 A2 | 1/2008 |
| WO | 2010002023 A1 | 1/2010 |
| WO | 2011101617 A2 | 8/2011 |
| WO | 2011101621 A2 | 8/2011 |
| WO | 2011141654 A2 | 11/2011 |
| WO | 2011141655 A2 | 11/2011 |
| WO | 2011141656 A2 | 11/2011 |
| WO | 2011161419 A1 | 12/2011 |
| WO | 2011163117 A1 | 12/2011 |
| WO | 2012069725 A1 | 5/2012 |
| WO | 2012110801 A1 | 8/2012 |
| WO | 2012151238 A2 | 11/2012 |

OTHER PUBLICATIONS

Downing, Ralph C., "Fluorocarbon Refrigerants Handbook," Chapter 3, Publ. Prentiss-Hall, Inc., 1988, pp. 17-43 US.

* cited by examiner

*Primary Examiner* — John R Hardee
(74) *Attorney, Agent, or Firm* — Colleen D. Szuch

(57) ABSTRACT

Compositions, methods and systems which comprise or utilize a multi-component mixture comprising: (a) HFC-32; (b) HFC-125; (c) HFO-1234ze, HFO-1234yf and combinations of these; and (d) optionally HFC-134a.

6 Claims, No Drawings

HEAT TRANSFER COMPOSITIONS AND METHODS

CROSS REFERENCES TO RELATED APPLICATIONS

The present application claims priority to U.S. Provisional Application Ser. No. 61/764,200, filed Feb. 13, 2013, the contents of which are incorporated herein by reference in its entirety.

FIELD OF THE INVENTION

This invention relates to compositions, methods and systems having utility in refrigeration applications, with particular benefit in low temperature applications, and in particular aspects to refrigerant and/or heat transfer compositions for replacement of refrigerant HFC-404A for heating and cooling applications and to retrofitting low temperature refrigerant systems, including systems designed for use with HFC-404A.

BACKGROUND

Mechanical refrigeration systems, and related heat transfer devices such as heat pumps and air conditioners, using refrigerant liquids are well known in the art for industrial, commercial and domestic uses. Fluorocarbon based fluids have found widespread use in many residential, commercial and industrial applications, including as the working fluid in systems such as air conditioning, heat pump and refrigeration systems. Because of certain suspected environmental problems, including the relatively high global warming potentials associated with the use of some of the compositions that have heretofore been used in these applications, it has become increasingly desirable to use fluids having low or even zero ozone depletion and global warming potentials, such as hydrofluorocarbons ("HFCs"). For example, a number of governments have signed the Kyoto Protocol to protect the global environment and setting forth a reduction of CO2 emissions (global warming). Thus, there is a need for a low- or non-flammable, non-toxic alternative to replace certain of high global warming HFCs.

One important type of refrigeration system is known as a "low temperature refrigeration system." Such systems are particularly important to the food manufacture, distribution, transport, and retail industries in that they play a vital role in ensuring that food which reaches the consumer is both fresh and fit to eat. In such low temperature refrigeration systems, a commonly used refrigerant liquid has been HFC-404A (the combination of HFC-125:HFC-143a:HFC134a in an approximate 44:52:4 weight ratio is referred to in the art as HFC-404A or R-404A). R-404A has an estimated high Global Warming Potential (GWP) of 3922.

There has thus been an increasing need for new fluorocarbon and hydrofluorocarbon compounds and compositions that are attractive alternatives to the compositions heretofore used in these and other applications. For example, it has become desirable to retrofit chlorine-containing refrigeration systems by replacing chlorine-containing refrigerants with non-chlorine-containing refrigerant compounds that will not deplete the ozone layer, such as hydrofluorocarbons (HFC's). Industry in general and the heat transfer industry in particular are continually seeking new fluorocarbon based mixtures that offer alternatives to, and are considered environmentally safer substitutes for, CFCs and HCFCs. It is generally considered important, however, at least with respect to heat transfer fluids, that any potential substitute must also possess those properties present in many of the most widely used fluids, such as excellent heat transfer properties, chemical stability, low- or no-toxicity, non-flammability and/or lubricant compatibility, among others.

With regard to efficiency in use, it is important to note that a loss in refrigerant thermodynamic performance or energy efficiency may have secondary environmental impacts through increased fossil fuel usage arising from an increased demand for electrical energy.

Furthermore, it is generally considered desirable for CFC refrigerant substitutes to be effective without major engineering changes to conventional vapor compression technology currently used with CFC refrigerants.

Flammability is another important property for many applications. That is, it is considered either important or essential in many applications, including particularly in heat transfer applications, to use compositions which are non-flammable. Thus, it is frequently beneficial to use in such compositions compounds which are nonflammable. As used herein, the term "nonflammable" refers to compounds or compositions which are determined to be nonflammable as determined in accordance with ASTM standard E-681, dated 2002, which is incorporated herein by reference. Unfortunately, many HFC's which might otherwise be desirable for used in refrigerant compositions are not nonflammable as that term is used herein. For example, the fluoroalkane difluoroethane (HFC-152a) and the fluoroalkene 1,1,1-trifluorpropene (HFO-1243zf) are each flammable and therefore not viable for use in many applications.

Applicants have thus come to appreciate a need for compositions, and particularly heat transfer compositions, that are highly advantageous in heating and cooling systems and methods, particularly vapor compression heating and cooling systems, and even more particularly low temperature refrigerant systems, including systems which are used with and/or have been designed for use with HFC-404A.

SUMMARY

Applicants have found that the above-noted needs, and other needs, can be satisfied by compositions, methods and systems which comprise or utilize a multi-component mixture, that in certain embodiments, comprises: (a) from greater than 0% to about 15% by weight of HFC-32; (b) from about 45% to about 80% by weight of HFC-125; (c) from about 0% to about 35% by weight of HFO-1234yf and from greater than 0% to about 35% by weight of HFO-1234ze; and (d) from about 0% to about 20% by weight of HFC-134a, with the weight percent being based on the total of the components (a)-(d) in the composition.

In certain preferred embodiments, HFC-32 is provided in an amount from greater than about 0% to about 12% by weight, in further embodiments in an amount from about 1% to about 12% by weight, in even further embodiments in an amount from about 3% to about 12% by weight, with the weight percent being based on the total of the components (a)-(d) in the composition. In even further embodiments, HFC-32 is provided in an amount from about 5% to about 15% by weight, with the weight percent being based on the total of the components (a)-(d) in the composition.

In certain preferred embodiments, HFC-125 is provided in an amount from about 40% to about 80% by weight, in further embodiments from about 50% to about 80% by weight, in further embodiments in an amount from about 45% to about 75% by weight, in further embodiments in an amount from about 50% to about 75% by weight, in even further embodiments in an amount from about 59% to about 72% by weight, and in even further embodiments is provided in an amount from about 59% to about 70% by weight, with the weight percent being based on the total of the components (a)-(d) in the composition. In even further embodiments, HFC-125 is provided in an amount from about 45% to about 70% by weight, with the weight percent being based on the total of the components (a)-(d) in the composition.

In certain preferred embodiments, HFO-1234yf is provided in an amount from about or greater than 0% to about 35% by weight, from about or greater than 0% to about 25% by weight, or from about or greater than 0% to about 22% by weight, with the weight percent being based on the total of the components (a)-(d) in the composition. In further embodiments, HFO-1234yf is provided in an amount from about 1% to about 35% by weight, in further embodiments in an amount from about 2% to about 35% by weight, in even further embodiments in an amount from about 5% to about 25% by weight, and in even further embodiments in an amount from about 5% to about 20% by weight, with the weight percent being based on the total of the components (a)-(d) in the composition. In further embodiments, HFO-1234yf is provided in an amount from about 10% to about 35% by weight or in an amount from about 10% to about 22% by weight, with the weight percent being based on the total of the components (a)-(d) in the composition.

In the same or alternative embodiments of the foregoing, HFO-1234ze is provided in an amount from greater than 0% to about 35% by weight of HFO-1234ze or from greater than 0% to about 15% by weight of HFO-1234ze, with the weight percent being based on the total of the components (a)-(d) in the composition. In further embodiments, HFO-1234ze is provided in an amount from about 1% to about 35% by weight, in further embodiments from about 1% to about 30% by weight, and in even further embodiments in an amount from about 2% to about 25% by weight, with the weight percent being based on the total of the components (a)-(d) in the composition. In even further embodiments, HFO-1234ze is provided in an amount from about 10% to about 35% by weight, in an amount from about 10% to about 30% by weight or in an amount from about 10% to about 25% by weight, with the weight percent being based on the total of the components (a)-(d) in the composition.

In certain embodiments, HFC-134a is provided in an amount from about 0% to about 15% by weight, in further embodiments in an amount from greater than 0% to about 12% by weight, with the weight percent being based on the total of the components (a)-(d) in the composition. In even further embodiments, HFC-134a is provided in an amount from about 5% by weight to about 20% by weight, with the weight percent being based on the total of the components (a)-(d) in the composition.

In further embodiments, the present invention relates to methods and systems which comprise or utilize a multi-component mixture, that in certain embodiments, comprises: (a) from greater than 0% to about 15% by weight of HFC-32; (b) from about 45% to about 80% by weight of HFC-125; (c) from about 0% to about 35% by weight of HFO-1234yf and from greater than 0% to about 35% by weight of HFO-1234ze; and (d) greater than 0% to about 20% by weight of HFC-134a, with the weight percent being based on the total of the components (a)-(d) in the composition.

The present invention also provides methods and systems which utilize the compositions of the present invention, including methods and systems for heat transfer and for retrofitting existing heat transfer systems. Certain preferred aspects of the present invention relate to methods of providing relatively low temperature cooling, such as in low temperature refrigeration systems, including transport refrigerant systems. Other preferred aspects of the present invention provide methods of retrofitting an existing refrigeration system, preferably low temperature refrigeration systems, designed to contain and/or containing R-404A refrigerant comprising introducing a composition of the present invention into the system without substantial engineering modification of said existing refrigeration system.

The term HFO-1234ze is used herein generically to refer to 1,1,1,3-tetrafluoropropene, independent of whether it is the cis- or trans-form. The terms "cisHFO-1234ze" and "transHFO-1234ze" are used herein to describe the cis- and trans-forms of 1,1,1,3-tetrafluoropropene respectively. The term "HFO-1234ze" therefore includes within its scope cisHFO-1234ze, transHFO-1234ze, and all combinations and mixtures of these.

DETAILED DESCRIPTION OF THE INVENTION

Low temperature refrigeration systems are important in many applications, such as to the food manufacture, distribution, retail industries, as well as in the transport of articles from one location to another. Such systems play a vital role in ensuring that food which reaches the consumer is both fresh and fit to eat. In such low temperature refrigeration systems, one of the refrigerant liquids which has been commonly used has been HFC-404A, which has an estimated high Global Warming Potential (GWP) of 3922. Applicants have found that the compositions of the present invention satisfy in an exceptional and unexpected way the need for alternatives and/or replacements for refrigerants in such applications, particularly and preferably HFC-404A, that at once have lower GWP values and provide substantially non-flammable, non-toxic fluids that have a close match in cooling capacity and/or efficiency to HFC-404A in such systems.

Heat Transfer Compositions

The compositions of the present invention are generally adaptable for use in heat transfer applications, that is, as a heating and/or cooling medium, but are particularly well adapted for use, as mentioned above, in low temperature refrigeration systems (including transport refrigerant systems), and preferably in low temperature systems, that have heretofore used HFC-404A and/or systems that have heretofore used R-22.

Applicants have found that use of the components of the present invention within the broad and narrowed ranges described herein is important to achieve the advantageous but difficult to achieve combinations of properties exhibited by the present compositions, particularly in the preferred systems and methods, and that use of these same components but substantially outside of the identified ranges can have a deleterious effect on one or more of the important properties of the compositions, systems or methods of the invention.

In certain preferred embodiments, compositions of the present invention comprise, consist essentially of, or consist of: (a) difluoromethane (HFC-32); (b) pentafluoroethane (HFC-125); (c) HFO-1234ze, HFO-1234yf or combinations thereof; and (d) optionally 1,1,1,2-tetrafluoroethane (HFC-134a).

HFC-32 may be provided in an amount of from greater than 0 wt. % to about 50 wt. % by weight of the composition, in certain aspects in an amount of from greater than 0 wt. % to about 40 wt. % by weight of the composition, in further aspects in an amount of from greater than 0 wt. % to about 15 wt. % by weight of the composition, and in even further aspects in an amount of from greater than 0 wt. % to about 12 wt. % by weight of the composition, each based on the total weight of the components (a)-(d). In further aspects of the present invention, HFC-32 may be provided in an amount of from about 1 wt. % to about 12 wt. % by weight of the composition, and in even further aspects in an amount of from about 3 wt. % to about 12 wt. % by weight of the composition, each based on the total weight of the components (a)-(d). In even further aspects of the present invention, HFC-32 may be provided in an amount of from about 1 wt. % to about 15 wt. % by weight of the composition, and in even further aspects in an amount of from about 5 wt. % to about 15 wt. % by weight of the composition, each based on the total weight of the components (a)-(d).

HFC-125 may be provided in an amount of from greater than 10 wt. % to about 90 wt. % by weight of the composition, in certain aspects in an amount of from about 30 wt. % to about 85 wt. % by weight of the composition, and in further aspects in an amount of from about 45 wt. % to about 75 wt. % by weight of the composition, based on the total weight of the components in (a)-(d). In certain further aspects, HFC-125 may be provided in an amount of from about 45 wt. % to about 80 wt. % by weight of the composition, in even further aspects in an amount of from about 50 wt. % to about 80 wt. % by weight of the composition, in even further aspects in an amount of from about 59 wt. % to about 72 wt. % by weight of the composition, and in even further aspects in an amount of from about 50 wt. % to about 70 wt. %, each based on the total weight of the components (a)-(d). In certain aspects, such as when component (d) is present in the composition, HFC-125 may be provided in an amount of from about 59 wt. % to about 70 wt. % by weight of the composition, or in an amount of from about 50 wt. % to about 75 wt. % by weight of the composition, each based on the total weight of the components (a)-(d).

HFO-1234ze may be provided in an amount of from about or greater than 0 wt. % to about 50 wt. % by weight of the composition, in certain aspects in an amount from about or greater than 0 wt. % to about 35 wt. % by weight of the composition, and in further aspects in an amount from about or greater than 0 wt. % to about 25 wt. % by weight of the composition, each based on the total weight of the components (a)-(d). In certain embodiments, HFO-1234ze is provided in an amount from about 1 wt. % to about 35 wt. % by weight of the composition, in further aspects in an amount from about 1% to about 30% by weight of the composition, in further aspects in an amount from about 2 wt. % to about 30 wt. % by weight of the composition, and in even further aspects in an amount from about 2 wt. % to about 25 wt. % by weight of the composition each based on the total weight of the components (a)-(d). In further embodiments, HFO-1234ze is provided in an amount from about 5 wt. % to about 30 wt. % by weight of the composition, in further aspects in an amount from about 10 wt. % to about 30 wt. % by weight of the composition, and in even further aspects in an amount from about 10 wt. % to about 25 wt. % by weight of the composition each based on the total weight of the components (a)-(d). In even further aspects, such as when component (d) is present in the composition, HFO-1234ze may be provided in an amount of from about or greater than 0 wt. % to about 30 wt. % by weight of the composition, in further aspects in an amount from about or greater than 0 wt. % to about 15 wt. % by weight of the composition, in further aspects in an amount from about 1 wt. % to about 30 wt. % by weight of the composition, and in even further aspects in an amount from about 1 wt. % to about 15 wt. % by weight of the composition, each based on the total weight of the components (a)-(d).

HFO-1234yf may be provided in an amount of from about or greater than 0 wt. % to about 50 wt. % by weight of the composition, in certain aspects in an amount of from about or greater than 0 wt. % to about 35 wt. % by weight of the composition, in further aspects in an amount of from about or greater than 0 wt. % to about 30 wt. % by weight of the composition, in further aspects in an amount of from about or greater than 0 wt. % to about 25 wt. % by weight of the composition, and in even further aspects in an amount of from about or greater than 0 wt. % to about 22 wt. % by weight of the composition, with the weight percent being based on the total of the components (a)-(d) in the composition. In even further aspects, HFO-1234yf is provided in an amount of from about 5 wt. % to about 25 wt. % by weight of the composition, and in even further aspects in an amount of from about or greater than 5 wt. % to about 20 wt. % by weight of the composition, each based on the total weight of the components (a)-(d). In certain embodiments, HFO-1234yf is provided in an amount from about 1 wt. % to about 30 wt. % by weight of the composition, in further aspects in an amount from about 2 wt. % to about 30 wt. % by weight of the composition, in even further aspects in an amount from about 2 wt. % to about 25 wt. % by weight of the composition, with the weight percent being based on the total of the components (a)-(d) in the composition. In even further aspects, HFO-1234yf is provided in an amount from about 10 wt. % to about 35 wt. % by weight of the composition, in even further aspects in an amount from about 10 wt. % to about 22 wt. % by weight of the composition, each based on the total weight of the components (a)-(d). In certain aspects of the present invention, such as when component (d) is present in the composition, HFO-1234yf may be provided in an amount of from about or greater than 0 wt. % to about 20 wt. % by weight of the composition, in further aspects in an amount from about or greater than 1 wt. % to about 20 wt. % by weight of the composition, and in even further aspects in an amount from about 5 wt. % to about 20 wt. % by weight of the composition, each based on the total weight of the components (a)-(d).

HFC-134a may be provided in an amount of from about or greater than 0 wt. % to about 50 wt. % by weight of the composition, in certain aspects in an amount of from about or greater than 0 wt. % to about 40 wt. % by weight of the composition, in further aspects in an amount of from about or greater than 0 wt. % to about 20 wt. % by weight of the composition, in further aspects in an amount of from about or greater than 0 wt. % to about 15 wt. % by weight of the composition, and in even further aspects in an amount of from about or greater than 0 wt. % to about 12 wt. % by weight of the composition, each based on the total weight of the components (a)-(d). In certain aspects, component (d) is not present in the composition. In further aspects of the invention when it is present, it may be provided in an amount of from about 1 wt. % to about 15 wt. % by weight of the composition, or in further aspects in an amount from about 1 wt. % to about 12 wt. % by weight of the composition, each based on the total weight of the components (a)-(d). In even further aspects of the invention when it is present, HFC-134a may be provided in an amount of from about 5 wt. % to about 20 wt. % by weight of the composition, based on the total weight of the components (a)-(d).

Highly preferred combinations of properties are achieved for compositions having a weight ratio of HFC-32:HFC-125 of from about 0.01:1 to about 0.5:1, with a ratio of about 0.09:1 to about 0.2:1 being preferred in certain embodiments. Applicants have found that highly preferred combinations of properties are also achieved for compositions having a weight ratio of HFO-1234ze:HFO-1234yf of from about 5:1 to about 0.1:1 or between about 3:1 to about 0.2:1.

For the purposes of convenience, the combination HFO-1234ze and HFO-1234yf is referred to herein as the "tetrafluoropropene component" or "TFC," and in certain embodiments highly preferred combinations of properties can be achieved for composition which comprise a weight ratio of HFC-134a:TFC (when HFC-134a is present) of from about 0.01:1 to about 1:1, with a ratio of about 0.2:1 to about 1:1 being preferred in certain embodiments.

Although it is contemplated that either isomer of HFO-1234ze may be used, applicants have found that it is preferred, in certain embodiments, that the HFO-1234ze comprise transHFO-1234ze, and preferably comprise transHFO-1234ze in major proportion, and in certain embodiments consist essentially of transHFO-1234ze.

As mentioned above, applicants have found that the compositions of the present invention are capable of achieving a difficult to achieve combination of properties, including particularly low GWP. By way of non-limiting example, the following Table A illustrates the substantial improvement in GWP, to about 63% of GWP of HFC-404A, exhibited by certain compositions of the present invention in comparison to the GWP of HFC-404A, which has a GWP of 3922. Table B illustrates a second group of compositions which provides further reduction of GWP, to about 56% GWP of HFC-404A. Table C illustrates a third group of compositions which provide further reduction of GWP, to about 54% of HFC-404A.

TABLE A

| | Composition of the Invention (weight fraction, based on identified components) | Name | GWP | GWP as a Percentage of R404A GWP |
|---|---|---|---|---|
| R125 + R134a + R143a | R125/R134a/R143a (0.44/0.04/0.52) | R404A | 3922 | |
| Group 1 R32 + R125 + R1234yf + R1234ze | R32/R125/R1234yf (0.09/0.69/0.22) | A1 | 2476 | 63% |
| | R32/R125/R1234ze (0.10/0.69/0.21) | A2 | 2483 | 63% |
| | R32/R125/R1234ze/1234yf (0.10/0.69/0.08/0.13) | A3 | 2483 | 63% |
| Group 2 R32 + R125 + R134a + R1234yf + R1234ze | R32/R125/R134a/1234yf (0.09/0.66/0.08/0.17) | A4 | 2485 | 63% |
| | R32/R125/R134a/R1234ze (0.10/0.66/0.08/0.16) | A5 | 2492 | 64% |
| | R32/R125/R134a/1234ze/1234yf (0.09/0.67/0.05/0.04/0.15) | A6 | 2477 | 63% |

TABLE B

| | Composition of the Invention (weight fraction, based on identified components) | Name | GWP | GWP as a Percentage of R404A GWP |
|---|---|---|---|---|
| R125 + R134a + R143a | R125/R134a/R143a (0.44/0.04/0.52) | R404A | 3922 | |
| Group 1 R32 + R125 + R1234yf + R1234ze | R32/R125/R1234yf (0.10/0.60/0.30) | B1 | 2168 | 55% |
| | R32/R125/R1234ze (0.12/0.60/0.28) | B2 | 2181 | 56% |
| | R32/R125/R1234ze/1234yf (0.09/0.60/0.13/0.18) | B3 | 2161 | 55% |
| Group 2 R32 + R125 + R134a + R1234yf + R1234ze | R32/R125/R134a/1234yf (0.09/0.54/0.17/0.20) | B4 | 2194 | 56% |
| | R32/R125/R134a/R1234ze (0.12/0.53/0.17/0.18) | B5 | 2179 | 56% |
| | R32/R125/R134a/1234ze/1234yf (0.09/0.57/0.09/0.07/0.18) | B6 | 2184 | 56% |

TABLE C

| | Composition of the Invention (weight fraction, based on identified components) | Name | GWP | GWP as a Percentage of R404A GWP |
|---|---|---|---|---|
| R125 + R134a + R143a | R125/R134a/R143a (0.44/0.04/0.52) | R404A | 3922 | |
| Group 1 R32 + R125 + R1234yf + R1234ze | R32/R125/R1234yf (0.10/0.58/0.32) | C1 | 2098 | 53% |
| | R32/R125/R1234ze (0.12/0.58/0.30) | C2 | 2111 | 54% |
| | R32/R125/R1234ze/1234yf (0.09/0.58/0.13/0.20) | C3 | 2091 | 53% |
| Group 2 R32 + R125 + R134a + R1234yf + R1234ze | R32/R125/R134a/1234yf (0.09/0.51/0.18/0.22) | C4 | 2103 | 54% |
| | R32/R125/R134a/R1234ze (0.12/0.51/0.17/0.20) | C5 | 2109 | 54% |
| | R32/R125/R134a/1234ze/1234yf (0.09/0.55/0.09/0.07/0.20) | C6 | 2114 | 54% |

The compositions of the present invention may include other components for the purpose of enhancing or providing certain functionality to the composition, or in some cases to reduce the cost of the composition. For example, refrigerant compositions according to the present invention, especially those used in vapor compression systems, include a lubricant, generally in amounts of from about 30 to about 50 percent by weight of the composition, and in some case potentially in amount greater than about 50 percent and other cases in amounts as low as about 5 percent. Furthermore, the present compositions may also include a compatibilizer, such as propane, for the purpose of aiding compatibility and/or solubility of the lubricant. Such compatibilizers, including propane, butanes and pentanes, are preferably present in amounts of from about 0.5 to about 5 percent by weight of the composition. Combinations of surfactants and solubilizing agents may also be added to the present compositions to aid oil solubility, as disclosed by U.S. Pat. No. 6,516,837, the disclosure of which is incorporated by reference. Commonly used refrigeration lubricants such as Polyol Esters (POEs) and Poly Alkylene Glycols (PAGs), PAG oils, silicone oil, mineral oil, alkyl benzenes (ABs) and poly(alpha-olefin) (PAO) that are used in refrigeration machinery with hydrofluorocarbon (HFC) refrigerants may be used with the refrigerant compositions of the present invention. Commercially available mineral oils include Witco LP 250 (registered trademark) from Witco, Zerol 300 (registered trademark) from Shrieve Chemical, Sunisco 3GS from Witco, and Calumet R015 from Calumet. Commercially available alkyl benzene lubricants include Zerol 150 (registered trademark). Commercially available esters include neopentyl glycol dipelargonate, which is available as Emery 2917 (registered trademark) and Hatcol 2370 (registered trademark). Other useful esters include phosphate esters, dibasic acid esters, and fluoroesters. In some cases, hydrocarbon based oils have sufficient solubility with the refrigerant that is comprised of an iodocarbon, the combination of the iodocarbon and the hydrocarbon oil might more stable than other types of lubricant. Such combination may therefore be advantageous. Preferred lubricants include polyalkylene glycols and esters. Polyalkylene glycols are highly preferred in certain embodiments because they are currently in use in particular applications such as mobile air-conditioning. Of course, different mixtures of different types of lubricants may be used.

Other additives not mentioned herein can also be included by those skilled in the art in view of the teachings contained herein without departing from the novel and basic features of the present invention.

Heat Transfer Methods and Systems

The present methods, systems and compositions are thus adaptable for use in connection with a wide variety of heat transfer systems in general and refrigeration systems in particular, such as air-conditioning (including both stationary and mobile air conditioning systems), refrigeration, heat-pump systems, and the like. In certain preferred embodiments, the compositions of the present invention are used in refrigeration systems originally designed for use with an HFC refrigerant, such as, for example, R-404. The preferred compositions of the present invention tend to exhibit many of the desirable characteristics of R-404A but have a GWP that is substantially lower than that of R-404A while at the same time having a capacity and/or efficiency that is substantially similar to or substantially matches, and preferably is as high as or higher than R-404A. In particular, applicants have recognized that certain preferred embodiments of the present compositions tend to exhibit relatively low global warming potentials ("GWPs"), preferably less than about 2500.

In certain other preferred embodiments, the present compositions are used in refrigeration systems which had contained and/or had originally been designed for use with R-404A. Preferred refrigeration compositions of the present invention may be used in refrigeration systems containing a lubricant used conventionally with R-404A, such as polyolester oils, and the like, or may be used with other lubricants traditionally used with HFC refrigerants. As used herein the term "refrigeration system" refers generally to any system or apparatus, or any part or portion of such a system or apparatus, which employs a refrigerant to provide cooling. Such refrigeration systems include, for example, air conditioners, electric refrigerators, chillers (including chillers using centrifugal compressors), and the like.

As mentioned above, the present invention achieves exceptional advantage in connection with systems known as low temperature refrigeration systems, including, but not limited to, transport refrigeration systems. As used herein the term "low temperature refrigeration system" refers to vapor compression refrigeration systems which utilize one or more compressors and a condenser temperature of from about 35° C. to about 45° C. In preferred embodiments of such systems, the systems have an evaporator temperature of from about −40° C. and less than about −15° C., more preferably from about −35° C. to about −25° C., with an evaporator temperature preferably of about −32° C. Moreover, in preferred embodiments of such systems, the systems have a degree of superheat at evaporator outlet of from about 0° C. to about 10° C., with a degree of superheat at evaporator outlet preferably of from about 4° C. to about 6° C. Furthermore, in preferred embodiments of such systems, the systems have a degree of superheat in the suction line of from about 15° C. to about 25° C., with a degree of superheat in the suction line preferably of from about 20° C. to about 25° C.

As used herein, the term "transport refrigeration system" includes, but is not limited to, trailers, trucks, and similar vehicle-based applications, particularly those which are or may be employed in food transportation and/or storage.

In one non-limiting embodiment, the heat transfer compositions of the present invention may be used to retrofit an existing refrigeration system with or without having to substantially modify the system and with or without having to drain completely the existing refrigerant. In one aspect, part of the refrigerant charge is drained from the system, which may include more than 5%, 10%, 25%, 50%, 75% or the like. The removed refrigerant charge is then replaced with one or a combination of the non-flammable, low GWP refrigerants discussed herein.

In alternative embodiments, rather than partially draining the existing system, the refrigerants of the present invention may be used to "top off" existing systems after a partial refrigerant leak. Many commercial systems, for example, have relatively high refrigerant leak rates which require routine addition of refrigerant over the life of the system. In one method of the present invention, a refrigerant system is provided with less than the full or designed charge of refrigerant in the system, which, in preferred embodiments, occurs as a result of leakage of refrigerant from the system, and a refrigerant composition of the present invention is used to recharge the system, preferably during normal recharge maintenance. If the system leaked R404A, for example, it would be recharged with one or a combination of the blends identified herein. The present methods permit such to occur while substantially maintaining capacity of the system, maintaining or improving energy efficiency (lower electricity consumption which equates to lower operating cost for the users), and lowering the GWP of the refrigerant contained in the system (lowering environmental impact). In preferred embodiments, such a method can be performed regardless of how much refrigerant has leaked, preferably without a blend calculation, and provides a simple (and low cost) way to reduce environmental impact associated with recharging of an existent system without deviating from the routine maintenance schedule of the system.

In accordance with the foregoing, applicants' have recognized that even relatively large amounts of R404A when used in combination with the blends of the present invention, whether in the form of an unintentional contaminant, as an intentionally added ingredient or as the remaining refrigerant after a system replacement or recharge, do not have a substantially deleterious effect on the performance of the refrigerants and/or refrigeration systems of the present invention. Conversely, applicants have also come to recognize that relatively large amounts of the blends of the present invention in R404A, whether in the form of an unintentional contaminant or as an intentionally added ingredient, do not have a substantially deleterious effect on the performance of the refrigerant. Accordingly, whereas in other cases the presence of such a contaminant might otherwise disqualify the use of the refrigerant with the contaminant, applicants have come to recognize that the use of such mixtures of refrigerants will generally be acceptable for the intended purpose. Accordingly, one advantage of the methods and compositions of the present invention is that, from a workability standpoint, there is generally not a great incentive to ensure that R404A is entirely absent from the low GWP refrigerants, and vice versa, and under such circumstances there is an increased possibility that, in the absence of the methods provided by the present invention, substantial and severe problems would arise with the operation of many existing automatic purge systems. However, the present methods overcome these problems and add reliability, safety and efficiency to the systems.

EXAMPLES

The following examples are provided for the purpose of illustrating the present invention but without limiting the scope thereof.

Example 1: Performance Parameters for Transport Refrigeration

The coefficient of performance (COP) is a universally accepted measure of refrigerant performance, especially useful in representing the relative thermodynamic efficiency of a refrigerant in a specific heating or cooling cycle involving evaporation or condensation of the refrigerant. In refrigeration engineering, this term expresses the ratio of useful refrigeration to the energy applied by the compressor in compressing the vapor. The capacity of a refrigerant represents the amount of cooling or heating it provides and provides some measure of the capability of a compressor to pump quantities of heat for a given volumetric flow rate of refrigerant. In other words, given a specific compressor, a refrigerant with a higher capacity will deliver more cooling or heating power. One means for estimating COP of a refrigerant at specific operating conditions is from the thermodynamic properties of the refrigerant using standard refrigeration cycle analysis techniques (see for example, R. C. Downing, FLUOROCARBON REFRIGERANTS HANDBOOK, Chapter 3, Prentice-Hall, 1988).

A low temperature refrigeration system typically used for refrigeration of food during transportation, such as those used trucks and trailers for refrigerated and/or frozen food transportation, is provided. In the case of such a system illustrated in this Example, the condenser temperature is set to 43.3° C., which generally corresponds to an outdoor temperature of about 37.8° C. The evaporating temperature is set to −34.4° C., which corresponds to a box temperature of about −28.9° C. The degree of superheat at evaporator outlet is set to 5.55° C. Such low temperature refrigeration systems for transport refrigeration are usually equipped with a heat exchanger between the liquid line (refrigerant line between condenser and expansion device) and the suction line (refrigerant line between evaporator and compressor), typically known as suction-line/liquid-line heat exchanger, in order to reduce performance penalties due to heat transfer gain in the refrigerant suction line inside the engine compartment. The suction-line/liquid-line heat exchanger provides substantial degree of subcooling at the inlet of the expansion device and degree of superheat at compressor inlet. The amount of degree of subcooling and superheat provided by the suction-line/liquid-line heat exchanger depends upon the refrigerant thermodynamic properties and the heat transfer goodness of the heat exchanger. A measure of the heat transfer goodness of a suction-line/liquid-line heat exchanger is given by its effectiveness which varies from 0% (minimum heat transfer) to 100% (maximum heat transfer). For this particular example, the effectiveness of the suction-line/liquid-line heat exchanger was set at 68%. An additional refrigerant temperature gain along the refrigerant line between the suction-line/liquid-line heat exchanger and the compressor inlet was set to 11.7° C. The compressor efficiency is set to 57%. The pressure drop and heat transfer in the connecting lines (suction and liquid lines) are considered negligible, and heat leakage through the compressor shell is ignored. Several operating parameters are determined for the compositions A1-A6 identified in Table A above in accordance with the present invention, and these operating parameters are reported in Table 1 below, based upon HFC-404A being the reference with a COP value of 100%, a capacity value of 100% and a discharge temperature of 162.6° C.

TABLE 1

| Name | GWP | Evaporator Glide (° C.) | Capacity (%) | COP (%) |
|---|---|---|---|---|
| R404A | 3922 | 0.5 | 100% | 100% |
| A1 | 2476 | 2.2 | 100% | 100% |
| A2 | 2483 | 5.4 | 92% | 101% |
| A3 | 2483 | 3.3 | 98% | 100% |
| A4 | 2485 | 2.6 | 98% | 101% |
| A5 | 2492 | 4.9 | 92% | 102% |
| A6 | 2477 | 3.0 | 97% | 101% |

As can be seen from the Table 1 above, applicants have found that the compositions of the present invention are capable of at once achieving many of the important refrigeration system performance parameters close to the parameters for R-404A, and in particular sufficiently close to permit such compositions to be used as a drop-in replacement for R-404A in low temperature refrigeration systems and/or for use in such existing systems with only minor system modification. For example, compositions A1-A6 exhibit capacities in this low temperature refrigeration system that are within about 8%, and even more preferably within about 5% of that of R404A. All these blends efficiencies (COP) higher that R404A by as much as 2% which is very desirable. Especially in view of the improved GWP of compositions A1-A6, these compositions of the present invention are excellent candidates for use as drop-in replacements for low temperature refrigeration systems originally containing and/or designed to contain R-404A.

Since many existing low temperature refrigeration systems have been designed for R-404A, or for other refrigerants with properties similar to R-404A, those skilled in the art will appreciate the substantial advantage of a refrigerant with low GWP and superior efficiency which can be used as replacement for R-404A or like refrigerants with relatively minimal modifications to the system. Furthermore, those skilled in the art will appreciate that the present compositions are capable of providing substantial advantage for use in new or newly designed refrigeration systems, including preferably, low temperature refrigeration systems.

Example 2: Retrofit Parameters for Transport Refrigeration

It is contemplated that in certain embodiments the present invention provides retrofitting methods which comprise removing at least a portion of the existing refrigerant from the system and replacing at least a portion of the removed refrigerant with a composition of the present invention, preferably without substantial modification of the system and even more preferably without any change in major system components, such as compressors, condensers, evaporators, and expansion valves. Due to certain characteristics of low temperature refrigeration systems, including particularly low temperature refrigeration systems containing or designed to contain R404A refrigerant, it is important in certain embodiments that such systems are capable of exhibiting reliable system operating parameters with drop-in refrigerants. Such operating parameters include:

High-Side Pressure that is within about 105%, and even more preferably within about 103% of the high side pressure of the system using R404A. This parameter is important in such embodiments because it allows the use of existing pressure components.

Discharge Temperature that is preferably lower than about 173° C., and even more preferably lower than about 167° C. The advantage of such a characteristic is that it permits the use of existing equipment without activation of the thermal protection aspects of the system, which are preferably designed to protect compressor components. This parameter is extremely important for these transport refrigeration systems as the use liquid line/suction line heat exchanger that increase greatly the compressor suction temperature and so the discharge temperature.

Lower suction pressures are acceptable if they do not cause the system to go into sub-atmospheric pressure at low evaporation temperatures. This positive pressure is required to ensure that the system has always positive pressure, avoiding any contamination with humid air in case of leak. To evaluate this requirement, one would employ a property called "Normal Boiling Temperature" (NBT: boiling temperature at atmospheric pressure) of the fluid in question. This NBT should be as close as possible to the one of the fluid replaced (R404A) and at least lower than the lowest evaporation temperature found in typical commercial systems (example: −40° C.).

A positive degree of superheat at the evaporator outlet is desirable when retrofitting systems. A typical value of 3 C is suggested as with a minimum value of 1 C.

The above-noted and other operating parameters are determined for the compositions A1-A6 identified in Table A above in accordance with the present invention, and these operating parameters is reported in Table 2 below:

TABLE 2

| Name | Discharge Pressure (%) | Discharge Temp. (° c.) | Suction Pressure (%) | Normal Boiling Temp. (° c.) | Degree of superheat at the evaporator outlet |
|---|---|---|---|---|---|
| R404A | 100% | 162.7 | 100% | −46.2 | 5.55 |
| A1 | 103% | 161.7 | 98% | −47.2 | 4.44 |
| A2 | 97% | 167.8 | 85% | −46.4 | −0.23 |
| A3 | 102% | 164.8 | 95% | −47 | 2.98 |
| A4 | 101% | 164.4 | 94% | −46.5 | 3.20 |
| A5 | 97% | 169.3 | 85% | −45.9 | −0.12 |
| A6 | 100% | 164.2 | 93% | −46.5 | 2.81 |

In certain preferred embodiments, the replacement step is a drop-in replacement in the sense that no substantial redesign or modification of the system is required and no major item of equipment needs to be replaced in order to accommodate the refrigerant of the present invention. That is the case with the compositions A1-A6, which in general can be used in most retrofit procedures without any change of major components. In all compositions A1-A6, the discharge pressure and temperature is below the limit and the Normal Boiling Temperature is similar to R404A therefore they can be used in most existent refrigeration systems.

Although the invention has been described with reference to preferred embodiments, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiments disclosed, but that the invention will include all embodiments falling within the scope of the appended claims or any claims later added.

Example 3: Performance Parameters for an Standard Refrigeration System

The coefficient of performance (COP) is a universally accepted measure of refrigerant performance, especially useful in representing the relative thermodynamic efficiency of a refrigerant in a specific heating or cooling cycle involving evaporation or condensation of the refrigerant. In refrigeration engineering, this term expresses the ratio of useful refrigeration to the energy applied by the compressor in compressing the vapor. The capacity of a refrigerant represents the amount of cooling or heating it provides and provides some measure of the capability of a compressor to pump quantities of heat for a given volumetric flow rate of refrigerant. In other words, given a specific compressor, a refrigerant with a higher capacity will deliver more cooling or heating power. One means for estimating COP of a refrigerant at specific operating conditions is from the thermodynamic properties of the refrigerant using standard refrigeration cycle analysis techniques (see for example, R. C. Downing, FLUOROCARBON REFRIGERANTS HANDBOOK, Chapter 3, Prentice-Hall, 1988).

A low temperature refrigeration system is provided. In the case of such a system illustrated in this Example, the condenser temperature is set to 40.55° C., which generally corresponds to an outdoor temperature of about 35° C. The degree of subcooling at the expansion device inlet is set to 5.55° C. The evaporating temperature is set to −31.6° C., which corresponds to a box temperature of about −26° C. The degree of superheat at evaporator outlet is set to 5.55° C. The degree of superheat in the suction line is set to 44.4° C., and the compressor efficiency is set to 65%. The pressure drop and heat transfer in the connecting lines (suction and liquid lines) are considered negligible, and heat leakage through the compressor shell is ignored. Several operating parameters are determined for the compositions A1-A6 identified in Table A above in accordance with the present invention, and these operating parameters are reported in Table 3 below, based upon HFC-404A having a COP value of 100%, a capacity value of 100% and a discharge temperature of 97.6° C.

TABLE 3

| Name | GWP | Evaporator Glide (° C.) | Capacity (%) | COP (%) |
| --- | --- | --- | --- | --- |
| R404A | 3922 | 0.5 | 100% | 100% |
| A1 | 2476 | 1.8 | 100% | 100% |
| A2 | 2483 | 4.7 | 94% | 104% |
| A3 | 2483 | 2.8 | 99% | 102% |

TABLE 3-continued

| Name | GWP | Evaporator Glide (° C.) | Capacity (%) | COP (%) |
| --- | --- | --- | --- | --- |
| A4 | 2485 | 2.1 | 99% | 102% |
| A5 | 2492 | 4.2 | 94% | 104% |
| A6 | 2477 | 2.5 | 98% | 102% |

As can be seen from the Table 3 above, applicants have found that the compositions of the present invention are capable of at once achieving many of the important refrigeration system performance parameters close to the parameters for R-404A, and in particular sufficiently close to permit such compositions to be used as a drop-in replacement for R-404A in low temperature refrigeration systems and/or for use in such existing systems with only minor system modification. For example, compositions A1-A6 exhibit capacities in this low temperature refrigeration system that are within about 6%, and even more preferably within about 2% of that of R404A. All these blends efficiencies (COP) higher that R404A by as much as 4% which is very desirable. Especially in view of the improved GWP of compositions A1-A6, these compositions of the present invention are excellent candidates for use as drop-in replacements for low temperature refrigeration systems originally containing and/or designed to contain R-404A.

Since many existing low temperature refrigeration systems have been designed for R-404A, or for other refrigerants with properties similar to R-404A, those skilled in the art will appreciate the substantial advantage of a refrigerant with low GWP and superior efficiency which can be used as replacement for R-404A or like refrigerants with relatively minimal modifications to the system. Furthermore, those skilled in the art will appreciate that the present compositions are capable of providing substantial advantage for use in new or newly designed refrigeration systems, including preferably, low temperature refrigeration systems.

Example 4: Retrofit Parameters for an Standard Refrigeration System

It is contemplated that in certain embodiments the present invention provides retrofitting methods which comprise removing at least a portion of the existing refrigerant from the system and replacing at least a portion of the removed refrigerant with a composition of the present invention, preferably without substantial modification of the system and even more preferably without any change in major system components, such as compressors, condensers, evaporators, and expansion valves. Due to certain characteristics of low temperature refrigeration systems, including particularly low temperature refrigeration systems containing or designed to contain R404A refrigerant, it is important in certain embodiments that such systems are capable of exhibiting reliable system operating parameters with drop-in refrigerants. Such operating parameters include:

High-Side Pressure that is within about 105%, and even more preferably within about 103% of the high side pressure of the system using R404A. This parameter is important in such embodiments because it allows the use of existing pressure components.

This applies to standard commercial refrigeration system (different than examples 1 and 2). Discharge Temperature that is preferably lower than about 140° C., and even more preferably lower than about 130° C. The advantage of such a characteristic is that it permits the use of existing equipment without activation of the thermal protection aspects of the system, which are preferably designed to protect compressor components. This parameter is advantageous in that it avoids the use of costly controls such as liquid injection to reduce discharge temperature.

Lower suction pressures are acceptable if they do not cause the system to go into sub-atmospheric pressure at low evaporation temperatures. This positive pressure is required to ensure that the system has always positive pressure, avoiding any contamination with humid air in case of leak. To evaluate this requirement, one would employ a property called "Normal Boiling Temperature" (NBT: boiling temperature at atmospheric pressure) of the fluid in question. This NBT should be as close as possible to the one of the fluid replaced (R404A) and at least lower than the lowest evaporation temperature found in typical commercial systems (example: −40° C.).

A positive degree of superheat at the evaporator outlet is desirable when retrofitting systems. A typical value of 3 C is suggested as with a minimum value of 1 C.

The above-noted and other operating parameters are determined for the compositions A1-A6 identified in Table A above in accordance with the present invention, and these operating parameters is reported in Table 4 below:

TABLE 4

| Name | Discharge Pressure (%) | Discharge Temp. (° c.) | Suction Pressure (%) | Normal Boiling Temp. (° c.) | Degree of superheat at the evaporator outlet |
|---|---|---|---|---|---|
| R404A | 100% | 125.6 | 100% | −46.2 | 5.55 |
| A1 | 103% | 126.2 | 98% | −47.2 | 4.46 |
| A2 | 97% | 133.2 | 85% | −46.4 | −0.18 |
| A3 | 102% | 129.4 | 94% | −47 | 3.02 |
| A4 | 101% | 128.6 | 94% | −46.5 | 3.23 |
| A5 | 96% | 134.0 | 84% | −45.9 | −0.08 |
| A6 | 100% | 128.7 | 93% | −46.5 | 2.84 |

In certain preferred embodiments, the replacement step is a drop-in replacement in the sense that no substantial redesign or modification of the system is required and no major item of equipment needs to be replaced in order to accommodate the refrigerant of the present invention. That is the case with the compositions A1-A6, which in general can be used in most retrofit procedures without any change of major components. In all compositions A1-A6, the discharge pressure and temperature is below the limit and the Normal Boiling Temperature is similar to R404A therefore they can be used in most existent refrigeration systems.

Example 5: Performance Parameters for Transport Refrigeration for GWP Less than 2200

The coefficient of performance (COP) is a universally accepted measure of refrigerant performance, especially useful in representing the relative thermodynamic efficiency of a refrigerant in a specific heating or cooling cycle involving evaporation or condensation of the refrigerant. In refrigeration engineering, this term expresses the ratio of useful refrigeration to the energy applied by the compressor in compressing the vapor. The capacity of a refrigerant represents the amount of cooling or heating it provides and provides some measure of the capability of a compressor to pump quantities of heat for a given volumetric flow rate of refrigerant. In other words, given a specific compressor, a refrigerant with a higher capacity will deliver more cooling or heating power. One means for estimating COP of a refrigerant at specific operating conditions is from the thermodynamic properties of the refrigerant using standard refrigeration cycle analysis techniques (see for example, R. C. Downing, FLUOROCARBON REFRIGERANTS HANDBOOK, Chapter 3, Prentice-Hall, 1988).

A low temperature refrigeration system typically used for refrigeration of food during transportation, such as those used trucks and trailers for refrigerated and/or frozen food transportation, is provided. In the case of such a system illustrated in this Example, the condenser temperature is set to 43.3° C., which generally corresponds to an outdoor temperature of about 37.8° C. The evaporating temperature is set to −34.4° C., which corresponds to a box temperature of about −28.9° C. The degree of superheat at evaporator outlet is set to 5.55° C. Such low temperature refrigeration systems are usually equipped with a heat exchanger between the liquid line (refrigerant line between condenser and expansion device) and the suction line (refrigerant line between evaporator and compressor), typically known as suction-line/liquid-line heat exchanger, in order to reduce performance penalties due to heat transfer gain in the refrigerant suction line inside the engine compartment. The suction-line/liquid-line heat exchanger provides substantial degree of subcooling at the inlet of the expansion device and degree of superheat at compressor inlet. The amount of degree of subcooling and superheat provided by the suction-line/liquid-line heat exchanger depends upon the refrigerant thermodynamic properties and the heat transfer goodness of the heat exchanger. A measure of the heat transfer goodness of a suction-line/liquid-line heat exchanger is given by its effectiveness which varies from 0% (minimum heat transfer) to 100% (maximum heat transfer). For this particular example, the effectiveness of the suction-line/liquid-line heat exchanger was set at 68%. An additional refrigerant temperature gain along the refrigerant line between the suction-line/liquid-line heat exchanger and the compressor inlet was set to 11.7° C. The compressor efficiency is set to 57%. The pressure drop and heat transfer in the connecting lines (suction and liquid lines) are considered negligible, and heat leakage through the compressor shell is ignored. Several operating parameters are determined for the compositions B1-B6 identified in Table B above in accordance with the present invention, and these operating parameters are reported in Table 5 below, based upon HFC-404A being the reference with a COP value of 100%, a capacity value of 100% and a discharge temperature of 162.6° C.

TABLE 5

| Name | GWP | Evaporator Glide (° C.) | Capacity (%) | COP (%) |
|---|---|---|---|---|
| R404A | 3922 | 0.5 | 100% | 100% |
| B1 | 2168 | 2.8 | 97% | 101% |
| B2 | 2181 | 6.4 | 88% | 103% |
| B3 | 2161 | 4.2 | 91% | 102% |
| B4 | 2194 | 3.2 | 91% | 102% |
| B5 | 2179 | 5.2 | 87% | 103% |
| B6 | 2184 | 3.7 | 90% | 102% |

As can be seen from the Table 5 above, applicants have found that the compositions of the present invention are capable of at once achieving many of the important refrigeration system performance parameters close to the parameters for R-404A, and in particular sufficiently close to permit such compositions to be used as a drop-in replacement for R-404A in low temperature refrigeration systems and/or for use in such existing systems with only minor system modification. For example, compositions B1-B6 exhibit capacities in this low temperature refrigeration system that are within about 13%, and even more preferably within about 10% of that of R404A. All these blends efficiencies (COP) higher that R404A by as much as 3% which is very desirable. Especially in view of the improved GWP of compositions B1-B6, these compositions of the present invention are excellent candidates for use as drop-in replacements for low temperature refrigeration systems originally containing and/or designed to contain R-404A.

Since many existing low temperature refrigeration systems have been designed for R-404A, or for other refrigerants with properties similar to R-404A, those skilled in the art will appreciate the substantial advantage of a refrigerant with low GWP and superior efficiency which can be used as replacement for R-404A or like refrigerants with relatively minimal modifications to the system. Furthermore, those skilled in the art will appreciate that the present compositions are capable of providing substantial advantage for use in new or newly designed refrigeration systems, including preferably, low temperature refrigeration systems.

Example 6: Retrofit Parameters for Transport Refrigeration for GWP Less than 2200

It is contemplated that in certain embodiments the present invention provides retrofitting methods which comprise removing at least a portion of the existing refrigerant from the system and replacing at least a portion of the removed refrigerant with a composition of the present invention, preferably without substantial modification of the system and even more preferably without any change in major system components, such as compressors, condensers, evaporators, and expansion valves. Due to certain characteristics of low temperature refrigeration systems, including particularly low temperature refrigeration systems containing or designed to contain R404A refrigerant, it is important in certain embodiments that such systems are capable of exhibiting reliable system operating parameters with drop-in refrigerants. Such operating parameters include:

High-Side Pressure that is within about 105%, and even more preferably within about 103% of the high side pressure of the system using R404A. This parameter is important in such embodiments because it allows the use of existing pressure components.

Discharge Temperature that is preferably lower than about 177° C., and even more preferably lower than about 167° C. The advantage of such a characteristic is that it permits the use of existing equipment without activation of the thermal protection aspects of the system, which are preferably designed to protect compressor components. This parameter is extremely important for these transport refrigeration systems as the use liquid line/suction line heat exchanger that increase greatly the compressor suction temperature and so the discharge temperature.

Lower suction pressures are acceptable if they do not cause the system to go into sub-atmospheric pressure at low evaporation temperatures. This positive pressure is required to ensure that the system has always positive pressure, avoiding any contamination with humid air in case of leak. To evaluate this requirement, one would employ a property called "Normal Boiling Temperature" (NBT: boiling temperature at atmospheric pressure) of the fluid in question. This NBT should be as close as possible to the one of the fluid replaced (R404A) and at least lower than the lowest evaporation temperature found in typical commercial systems (example: −40° C.).

The above-noted and other operating parameters are determined for the compositions B1-B6 identified in Table B above in accordance with the present invention, and these operating parameters are reported in Table 6 below:

TABLE 6

| Name | Discharge Pressure (%) | Discharge Temp. (° c.) | Suction Pressure (%) | Normal Boiling Temp. (° c.) | Degree of superheat at the evaporator outlet |
|---|---|---|---|---|---|
| R404A | 100% | 162.7 | 100% | −46.2 | 5.55 |
| B1 | 99% | 162.7 | 93% | −46.6 | 3.07 |
| B2 | 93% | 171.2 | 80% | −45.7 | −2.19 |
| B3 | 94% | 163.8 | 85% | −45.6 | 0.28 |
| B4 | 94% | 166.8 | 84% | −44.8 | 0.51 |
| B5 | 91% | 174.5 | 78% | −44.5 | −2.22 |
| B6 | 94% | 165.5 | 84% | −45.1 | 0.37 |

In certain preferred embodiments, the replacement step is a drop-in replacement in the sense that no substantial redesign or modification of the system is required and no major item of equipment needs to be replaced in order to accommodate the refrigerant of the present invention. That is the case with the compositions B1-B6, which in general can be used in most retrofit procedures without any change of major components. In all compositions B1-B6, the discharge pressure and temperature is below the limit and the Normal Boiling Temperature is similar to R404A therefore they can be used in most existent refrigeration systems.

Example 7: Performance Parameters for a Standard Refrigeration System for GWP Less than 2200

The coefficient of performance (COP) is a universally accepted measure of refrigerant performance, especially useful in representing the relative thermodynamic efficiency of a refrigerant in a specific heating or cooling cycle involving evaporation or condensation of the refrigerant. In refrigeration engineering, this term expresses the ratio of useful refrigeration to the energy applied by the compressor in compressing the vapor. The capacity of a refrigerant represents the amount of cooling or heating it provides and provides some measure of the capability of a compressor to pump quantities of heat for a given volumetric flow rate of refrigerant. In other words, given a specific compressor, a refrigerant with a higher capacity will deliver more cooling or heating power. One means for estimating COP of a refrigerant at specific operating conditions is from the thermodynamic properties of the refrigerant using standard refrigeration cycle analysis techniques (see for example, R. C. Downing, FLUOROCARBON REFRIGERANTS HANDBOOK, Chapter 3, Prentice-Hall, 1988).

A low temperature refrigeration system is provided. In the case of such a system illustrated in this Example, the condenser temperature is set to 40.55° C., which generally corresponds to an outdoor temperature of about 35° C. The degree of subcooling at the expansion device inlet is set to 5.55° C. The evaporating temperature is set to −31.6° C., which corresponds to a box temperature of about −26° C. The degree of superheat at evaporator outlet is set to 5.55° C. The degree of superheat in the suction line is set to 44.4° C., and the compressor efficiency is set to 65%. The pressure drop and heat transfer in the connecting lines (suction and liquid lines) are considered negligible, and heat leakage through the compressor shell is ignored. Several operating parameters are determined for the compositions B1-B6 identified in Table B above in accordance with the present invention, and these operating parameters are reported in Table 7 below, based upon HFC-404A having a COP value of 100%, a capacity value of 100% and a discharge temperature of 97.6° C.

TABLE 7

| Name | GWP | Evaporator Glide (° C.) | Capacity (%) | COP (%) |
|---|---|---|---|---|
| R404A | 3922 | 0.5 | 100% | 100% |
| B1 | 2168 | 2.3 | 98% | 102% |
| B2 | 2181 | 5.5 | 91% | 106% |
| B3 | 2161 | 3.6 | 92% | 103% |
| B4 | 2194 | 2.7 | 92% | 104% |
| B5 | 2179 | 4.5 | 90% | 107% |
| B6 | 2184 | 3.1 | 92% | 104% |

As can be seen from the Table 7 above, applicants have found that the compositions of the present invention are capable of at once achieving many of the important refrigeration system performance parameters close to the parameters for R-404A, and in particular sufficiently close to permit such compositions to be used as a drop-in replacement for R-404A in low temperature refrigeration systems and/or for use in such existing systems with only minor system modification. For example, compositions B1-B6 exhibit capacities in this low temperature refrigeration system that are within about 10% of that of R404A. All these blends efficiencies (COP) higher that R404A by as much as 7% which is very desirable. Especially in view of the improved GWP of compositions B1-B6, these compositions of the present invention are excellent candidates for use as drop-in replacements for low temperature refrigeration systems originally containing and/or designed to contain R-404A.

Since many existing low temperature refrigeration systems have been designed for R-404A, or for other refrigerants with properties similar to R-404A, those skilled in the art will appreciate the substantial advantage of a refrigerant with low GWP and superior efficiency which can be used as replacement for R-404A or like refrigerants with relatively minimal modifications to the system. Furthermore, those skilled in the art will appreciate that the present compositions are capable of providing substantial advantage for use in new or newly designed refrigeration systems, including preferably, low temperature refrigeration systems.

Example 8: Retrofit Parameters for an Standard Refrigeration System for GWP Less than 2200

It is contemplated that in certain embodiments the present invention provides retrofitting methods which comprise removing at least a portion of the existing refrigerant from the system and replacing at least a portion of the removed refrigerant with a composition of the present invention, preferably without substantial modification of the system and even more preferably without any change in major system components, such as compressors, condensers, evaporators, and expansion valves. Due to certain characteristics of low temperature refrigeration systems, including particularly low temperature refrigeration systems containing or designed to contain R404A refrigerant, it is important in certain embodiments that such systems are capable of exhibiting reliable system operating parameters with drop-in refrigerants. Such operating parameters include:

High-Side Pressure that is within about 105%, and even more preferably within about 103% of the high side pressure of the system using R404A. This parameter is important in such embodiments because it allows the use of existing pressure components.

This applies to standard commercial refrigeration system (different than examples 1 and 2). Discharge Temperature that is preferably lower than about 140° C., and even more preferably lower than about 130° C. The advantage of such a characteristic is that it permits the use of existing equipment without activation of the thermal protection aspects of the system, which are preferably designed to protect compressor components. This parameter is advantageous in that it avoids the use of costly controls such as liquid injection to reduce discharge temperature.

Lower suction pressures are acceptable if they do not cause the system to go into sub-atmospheric pressure at low evaporation temperatures. This positive pressure is required to ensure that the system has always positive pressure, avoiding any contamination with humid air in case of leak. To evaluate this requirement, one would employ a property called "Normal Boiling Temperature" (NBT: boiling temperature at atmospheric pressure) of the fluid in question. This NBT should be as close as possible to the one of the fluid replaced (R404A) and at least lower than the lowest evaporation temperature found in typical commercial systems (example: −40° C.).

The above-noted and other operating parameters are determined for the compositions B1-B6 identified in Table B above in accordance with the present invention, and these operating parameters is reported in Table 8 below:

TABLE 8

| Name | Discharge Pressure (%) | Discharge Temp. (° c.) | Suction Pressure (%) | Normal Boiling Temp. (° c.) | Degree of superheat at the evaporator outlet |
|---|---|---|---|---|---|
| R404A | 100% | 125.6 | 100% | −46.2 | 5.55 |
| B1 | 99% | 127.6 | 93% | −46.6 | 3.07 |
| B2 | 93% | 136.8 | 79% | −45.7 | −2.17 |
| B3 | 94% | 129.3 | 84% | −45.6 | 0.29 |
| B4 | 93% | 131.2 | 83% | −44.8 | 0.52 |
| B5 | 91% | 138.8 | 77% | −44.5 | −2.20 |
| B6 | 94% | 130.4 | 84% | −45.1 | 0.37 |

In certain preferred embodiments, the replacement step is a drop-in replacement in the sense that no substantial redesign or modification of the system is required and no major item of equipment needs to be replaced in order to accommodate the refrigerant of the present invention. That is the case with the compositions B1-B6, which in general can be used in most retrofit procedures without any change of major components. In all compositions B1-B6, the discharge pressure and temperature is below the limit and the Normal Boiling Temperature is similar to R404A therefore they can be used in most existent refrigeration systems.

Example 9: Performance Parameters for Transport Refrigeration for GWP Less than 2150

The coefficient of performance (COP) is a universally accepted measure of refrigerant performance, especially useful in representing the relative thermodynamic efficiency of a refrigerant in a specific heating or cooling cycle involving evaporation or condensation of the refrigerant. In refrigeration engineering, this term expresses the ratio of useful refrigeration to the energy applied by the compressor in compressing the vapor. The capacity of a refrigerant represents the amount of cooling or heating it provides and provides some measure of the capability of a compressor to pump quantities of heat for a given volumetric flow rate of refrigerant. In other words, given a specific compressor, a refrigerant with a higher capacity will deliver more cooling or heating power. One means for estimating COP of a refrigerant at specific operating conditions is from the thermodynamic properties of the refrigerant using standard refrigeration cycle analysis techniques (see for example, R. C. Downing, FLUOROCARBON REFRIGERANTS HANDBOOK, Chapter 3, Prentice-Hall, 1988).

A low temperature refrigeration system typically used for refrigeration of food during transportation, such as those used trucks and trailers for refrigerated and/or frozen food transportation, is provided. In the case of such a system illustrated in this Example, the condenser temperature is set to 43.3° C., which generally corresponds to an outdoor temperature of about 37.8° C. The evaporating temperature is set to −34.4° C., which corresponds to a box temperature of about −28.9° C. The degree of superheat at evaporator outlet is set to 5.55° C. Such low temperature refrigeration systems are usually equipped with a heat exchanger between the liquid line (refrigerant line between condenser and expansion device) and the suction line (refrigerant line between evaporator and compressor), typically known as suction-line/liquid-line heat exchanger, in order to reduce performance penalties due to heat transfer gain in the refrigerant suction line inside the engine compartment. The suction-line/liquid-line heat exchanger provides substantial degree of subcooling at the inlet of the expansion device and degree of superheat at compressor inlet. The amount of degree of subcooling and superheat provided by the suction-line/liquid-line heat exchanger depends upon the refrigerant thermodynamic properties and the heat transfer goodness of the heat exchanger. A measure of the heat transfer goodness of a suction-line/liquid-line heat exchanger is given by its effectiveness which varies from 0% (minimum heat transfer) to 100% (maximum heat transfer). For this particular example, the effectiveness of the suction-line/liquid-line heat exchanger was set at 68%. An additional refrigerant temperature gain along the refrigerant line between the suction-line/liquid-line heat exchanger and the compressor inlet was set to 11.7° C. The compressor efficiency is set to 57%. The pressure drop and heat transfer in the connecting lines (suction and liquid lines) are considered negligible, and heat leakage through the compressor shell is ignored. Several operating parameters are determined for the compositions C1-C6 identified in Table C above in accordance with the present invention, and these operating parameters are reported in Table 9 below, based upon HFC-404A being the reference with a COP value of 100%, a capacity value of 100% and a discharge temperature of 162.6° C.

TABLE 9

| Name | GWP | Evaporator Glide (° C.) | Capacity (%) | COP (%) |
|---|---|---|---|---|
| R404A | 3922 | 0.5 | 100% | 100% |
| C1 | 2098 | 2.9 | 96% | 101% |
| C2 | 2111 | 6.6 | 87% | 103% |

TABLE 9-continued

| Name | GWP | Evaporator Glide (° C.) | Capacity (%) | COP (%) |
|---|---|---|---|---|
| C3 | 2091 | 4.2 | 90% | 102% |
| C4 | 2103 | 3.3 | 89% | 103% |
| C5 | 2109 | 5.4 | 86% | 104% |
| C6 | 2114 | 3.7 | 90% | 102% |

As can be seen from the Table 9 above, applicants have found that the compositions of the present invention are capable of at once achieving many of the important refrigeration system performance parameters close to the parameters for R-404A, and in particular sufficiently close to permit such compositions to be used as a drop-in replacement for R-404A in low temperature refrigeration systems and/or for use in such existing systems with only minor system modification. For example, compositions C1-C6 exhibit capacities in this low temperature refrigeration system that are within about 14%, and even more preferably within about 10% of that of R404A. All these blends efficiencies (COP) higher that R404A by as much as 4% which is very desirable. Especially in view of the improved GWP of compositions C1-C6, these compositions of the present invention are excellent candidates for use as drop-in replacements for low temperature refrigeration systems originally containing and/or designed to contain R-404A.

Since many existing low temperature refrigeration systems have been designed for R-404A, or for other refrigerants with properties similar to R-404A, those skilled in the art will appreciate the substantial advantage of a refrigerant with low GWP and superior efficiency which can be used as replacement for R-404A or like refrigerants with relatively minimal modifications to the system. Furthermore, those skilled in the art will appreciate that the present compositions are capable of providing substantial advantage for use in new or newly designed refrigeration systems, including preferably, low temperature refrigeration systems.

Example 10: Retrofit Parameters for Transport Refrigeration for GWP Less than 2150

It is contemplated that in certain embodiments the present invention provides retrofitting methods which comprise removing at least a portion of the existing refrigerant from the system and replacing at least a portion of the removed refrigerant with a composition of the present invention, preferably without substantial modification of the system and even more preferably without any change in major system components, such as compressors, condensers, evaporators, and expansion valves. Due to certain characteristics of low temperature refrigeration systems, including particularly low temperature refrigeration systems containing or designed to contain R404A refrigerant, it is important in certain embodiments that such systems are capable of exhibiting reliable system operating parameters with drop-in refrigerants. Such operating parameters include:

High-Side Pressure that is within about 105%, and even more preferably within about 103% of the high side pressure of the system using R404A. This parameter is important in such embodiments because it allows the use of existing pressure components.

Discharge Temperature that is preferably lower than about 177° C., and even more preferably lower than about 167° C. The advantage of such a characteristic is that it permits the use of existing equipment without activation of the thermal protection aspects of the system, which are preferably designed to protect compressor components. This parameter is extremely important for these transport refrigeration systems as the use liquid line/suction line heat exchanger that increase greatly the compressor suction temperature and so the discharge temperature.

Lower suction pressures are acceptable if they do not cause the system to go into sub-atmospheric pressure at low evaporation temperatures. This positive pressure is required to ensure that the system has always positive pressure, avoiding any contamination with humid air in case of leak. To evaluate this requirement, one would employ a property called "Normal Boiling Temperature" (NBT: boiling temperature at atmospheric pressure) of the fluid in question. This NBT should be as close as possible to the one of the fluid replaced (R404A) and at least lower than the lowest evaporation temperature found in typical commercial systems (example: −40° C.).

The above-noted and other operating parameters are determined for the compositions C1-C6 identified in Table C above in accordance with the present invention, and these operating parameters are reported in Table 10 below:

TABLE 10

| Name | Discharge Pressure (%) | Discharge Temp. (° C.) | Suction Pressure (%) | Normal Boiling Temp. (° C.) | Degree of superheat at the evaporator outlet |
|---|---|---|---|---|---|
| R404A | 100% | 162.7 | 100% | −46.2 | 5.55 |
| C1 | 98% | 162.6 | 92% | −46.5 | 2.7 |
| C2 | 91% | 171.4 | 78% | −45.4 | −2.8 |
| C3 | 93% | 163.6 | 84% | −45.4 | 0.0 |
| C4 | 92% | 167.0 | 82% | −44.4 | 0.0 |
| C5 | 90% | 174.7 | 76% | −44.2 | −2.8 |
| C6 | 93% | 165.3 | 83% | −44.9 | 0.1 |

In certain preferred embodiments, the replacement step is a drop-in replacement in the sense that no substantial redesign or modification of the system is required and no major item of equipment needs to be replaced in order to accommodate the refrigerant of the present invention. That is the case with the compositions C1-C6, which in general can be used in most retrofit procedures without any change of major components. In all compositions C1-C6, the discharge pressure and temperature is below the limit and the Normal Boiling Temperature is similar to R404A therefore they can be used in most existent refrigeration systems.

Example 11: Performance Parameters for a Standard Refrigeration System for GWP Less than 2150

The coefficient of performance (COP) is a universally accepted measure of refrigerant performance, especially useful in representing the relative thermodynamic efficiency of a refrigerant in a specific heating or cooling cycle involving evaporation or condensation of the refrigerant. In refrigeration engineering, this term expresses the ratio of useful refrigeration to the energy applied by the compressor in compressing the vapor. The capacity of a refrigerant represents the amount of cooling or heating it provides and provides some measure of the capability of a compressor to pump quantities of heat for a given volumetric flow rate of refrigerant. In other words, given a specific compressor, a refrigerant with a higher capacity will deliver more cooling or heating power. One means for estimating COP of a refrigerant at specific operating conditions is from the thermodynamic properties of the refrigerant using standard refrigeration cycle analysis techniques (see for example, R. C. Downing, FLUOROCARBON REFRIGERANTS HANDBOOK, Chapter 3, Prentice-Hall, 1988).

A low temperature refrigeration system is provided. In the case of such a system illustrated in this Example, the condenser temperature is set to 40.55° C., which generally corresponds to an outdoor temperature of about 35° C. The degree of subcooling at the expansion device inlet is set to 5.55° C. The evaporating temperature is set to −31.6° C., which corresponds to a box temperature of about −26° C. The degree of superheat at evaporator outlet is set to 5.55° C. The degree of superheat in the suction line is set to 44.4° C., and the compressor efficiency is set to 65%. The pressure drop and heat transfer in the connecting lines (suction and liquid lines) are considered negligible, and heat leakage through the compressor shell is ignored. Several operating parameters are determined for the compositions C1-C6 identified in Table C above in accordance with the present invention, and these operating parameters are reported in Table 11 below, based upon HFC-404A having a COP value of 100%, a capacity value of 100% and a discharge temperature of 97.6° C.

TABLE 11

| Name | GWP | Evaporator Glide (° C.) | Capacity (%) | COP (%) |
|---|---|---|---|---|
| R404A | 3922 | 0.5 | 100% | 100% |
| C1 | 2098 | 2.4 | 97% | 102% |
| C2 | 2111 | 5.7 | 89% | 106% |
| C3 | 2091 | 3.6 | 91% | 103% |
| C4 | 2103 | 2.7 | 91% | 105% |
| C5 | 2109 | 4.6 | 89% | 108% |
| C6 | 2114 | 3.1 | 91% | 104% |

As can be seen from the Table 11 above, applicants have found that the compositions of the present invention are capable of at once achieving many of the important refrigeration system performance parameters close to the parameters for R-404A, and in particular sufficiently close to permit such compositions to be used as a drop-in replacement for R-404A in low temperature refrigeration systems and/or for use in such existing systems with only minor system modification. For example, compositions C1-C6 exhibit capacities in this low temperature refrigeration system that are within about 10% of that of R404A. All these blends efficiencies (COP) higher that R404A by as much as 8% which is very desirable. Especially in view of the improved GWP of compositions C1-C6, these compositions of the present invention are excellent candidates for use as drop-in replacements for low temperature refrigeration systems originally containing and/or designed to contain R-404A.

Since many existing low temperature refrigeration systems have been designed for R-404A, or for other refrigerants with properties similar to R-404A, those skilled in the art will appreciate the substantial advantage of a refrigerant with low GWP and superior efficiency which can be used as replacement for R-404A or like refrigerants with relatively minimal modifications to the system. Furthermore, those skilled in the art will appreciate that the present compositions are capable of providing substantial advantage for use in new or newly designed refrigeration systems, including preferably, low temperature refrigeration systems.

Example 12: Retrofit Parameters for an Standard Refrigeration System for GWP Less than 2150

It is contemplated that in certain embodiments the present invention provides retrofitting methods which comprise removing at least a portion of the existing refrigerant from the system and replacing at least a portion of the removed refrigerant with a composition of the present invention, preferably without substantial modification of the system and even more preferably without any change in major system components, such as compressors, condensers, evaporators, and expansion valves. Due to certain characteristics of low temperature refrigeration systems, including particularly low temperature refrigeration systems containing or designed to contain R404A refrigerant, it is important in certain embodiments that such systems are capable of exhibiting reliable system operating parameters with drop-in refrigerants. Such operating parameters include:

High-Side Pressure that is within about 105%, and even more preferably within about 103% of the high side pressure of the system using R404A. This parameter is important in such embodiments because it allows the use of existing pressure components.

This applies to standard commercial refrigeration system (different than examples 1 and 2). Discharge Temperature that is preferably lower than about 140° C., and even more preferably lower than about 130° C. The advantage of such a characteristic is that it permits the use of existing equipment without activation of the thermal protection aspects of the system, which are preferably designed to protect compressor components. This parameter is advantageous in that it avoids the use of costly controls such as liquid injection to reduce discharge temperature.

Lower suction pressures are acceptable if they do not cause the system to go into sub-atmospheric pressure at low evaporation temperatures. This positive pressure is required to ensure that the system has always positive pressure, avoiding any contamination with humid air in case of leak. To evaluate this requirement, one would employ a property called "Normal Boiling Temperature" (NBT: boiling temperature at atmospheric pressure) of the fluid in question. This NBT should be as close as possible to the one of the fluid replaced (R404A) and at least lower than the lowest evaporation temperature found in typical commercial systems (example: −40° C.).

The above-noted and other operating parameters are determined for the compositions C1-C6 identified in Table C above in accordance with the present invention, and these operating parameters is reported in Table 12 below:

TABLE 12

| Name | Discharge Pressure (%) | Discharge Temp. (° C.) | Suction Pressure (%) | Normal Boiling Temp. (° C.) | Degree of superheat at the evaporator outlet |
|---|---|---|---|---|---|
| R404A | 100% | 125.6 | 100% | −46.2 | 5.55 |
| C1 | 98% | 127.6 | 92% | −46.5 | 2.7 |
| C2 | 91% | 137.1 | 77% | −45.4 | −2.8 |
| C3 | 93% | 129.2 | 83% | −45.4 | 0.0 |
| C4 | 92% | 131.3 | 82% | −44.4 | 0.0 |
| C5 | 90% | 139.1 | 75% | −44.2 | −2.8 |
| C6 | 93% | 130.3 | 83% | −44.9 | 0.1 |

In certain preferred embodiments, the replacement step is a drop-in replacement in the sense that no substantial redesign or modification of the system is required and no major item of equipment needs to be replaced in order to accommodate the refrigerant of the present invention. That is the case with the compositions C1-C6, which in general can be used in most retrofit procedures without any change of major components. In all compositions C1-C6, the discharge pressure and temperature is below the limit and the Normal Boiling Temperature is similar to R404A therefore they can be used in most existent refrigeration systems.

Although the invention has been described with reference to preferred embodiments, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiments disclosed, but that the invention will include all embodiments falling within the scope of the appended claims or any claims later added.

What is claimed is:

1. A heat transfer composition consisting of: (a) about 10% by weight of HFC-32; (b) about 69% by weight of HFC-125; (c) about 8% by weight of HFO-1234yf and (d) about 13% by weight of transHFO-1234ze, with the weight percent being based on the total of the components (a)-(d) in the composition, wherein the composition is nonflammable, as determined in accordance with ASTM standard E-681, and the composition has a GWP below 2500.

2. A heat transfer composition consisting of: (a) about 10% by weight of HFC-32; (b) about 69% by weight of HFC-125; (c) about 8% by weight of HFO-1234yf and (d) about 13% by weight of trans-HFO-1234ze, with the weight percent being based on the total of the components (a)-(d) in the composition, wherein the composition is nonflammable, as determined in accordance with ASTM standard E-681, and the composition has a GWP below 2500, and wherein when the composition is provided as a drop-in replacement for R-404A in a low temperature refrigeration system and wherein the system exhibits a degree of superheat at an evaporator outlet of between 1° C. and 3° C.

3. A method of replacing an existing heat transfer fluid contained in heat transfer system comprising removing at least a portion of said existing heat transfer fluid from said system, said existing heat transfer fluid being HFC-404A and replacing at least a portion of said existing heat transfer fluid by introducing into said system a heat transfer composition consisting of: (a) about 10% by weight of HFC-32; (b) about 69% by weight of HFC-125; (c) from about 8% by weight of HFO-1234yf and (d) about 13% by weight of trans-HFO-1234ze, with the weight percent being based on the total of the components (a)-(d) in the composition, wherein the composition is nonflammable, as determined in accordance with ASTM standard E-681, and the composition has a GWP below 2500, and wherein when the composition is provided as a drop-in replacement for R-404A in a low temperature refrigeration system and wherein the system exhibits a degree of superheat at an evaporator outlet of between 1° C. and 3° C.

4. A heat transfer system comprising a compressor, a condenser and an evaporator in fluid communication, and a heat transfer composition in said system, said heat transfer composition consisting of: (a) about 10% by weight of HFC-32; (b) about 69% by weight of HFC-125; (c) about 8% by weight of HFO-1234yf and (d) about 13% by weight of trans-HFO-1234ze, with the weight percent being based on the total of the components (a)-(d) in the composition, wherein the composition is nonflammable, as determined in accordance with ASTM standard E-681, and the composition has a GWP below 2500, and wherein when the composition is provided as a drop-in replacement for R-404A in a low temperature refrigeration system and wherein the system exhibits a degree of superheat at an evaporator outlet of between 1° C. and 3° C.

5. The heat transfer system of claim 4 wherein said evaporator has an operating temperature of from about −40° C. up to less than about −15° C.

6. The heat transfer system of claim 4 wherein said evaporator has an operating temperature of from about −35° C. to about −25° C.

* * * * *